United States Patent [19]

Strawczynski et al.

[11] Patent Number: 5,239,676

[45] Date of Patent: Aug. 24, 1993

[54] INTRA-CELL CALL HAND-OVER IN RADIO COMMUNICATION SYSTEMS WITH DYNAMIC CHANNEL ALLOCATION

[75] Inventors: Leo Strawczynski; Howard M. Sandler, both of Ottawa; Gregory L. Plett, North Gower; David G. Steer, Nepean, all of Canada

[73] Assignee: Northern Telecom Limited, Montreal, Canada

[21] Appl. No.: 710,866

[22] Filed: Jun. 6, 1991

[30] Foreign Application Priority Data

Dec. 14, 1990 [CA] Canada .................... 2032325

[51] Int. Cl.⁵ .................... H04Q 7/00; H04Q 9/02; H04B 15/02
[52] U.S. Cl. .................... 455/33.2; 455/54.2; 455/56.1; 455/62; 379/60; 379/63
[58] Field of Search .................... 455/33.1, 33.2, 34.1, 455/34.2, 53.1, 54.1, 54.2, 56.1, 62, 63; 379/59, 60, 63

[56] References Cited

U.S. PATENT DOCUMENTS

| | | | |
|---|---|---|---|
| 4,475,010 | 10/1984 | Huensch et al. | 455/56.1 |
| 4,771,448 | 9/1988 | Koohgoli et al. | 455/34.2 |
| 4,916,728 | 4/1990 | Blair | 455/33.1 |
| 5,038,399 | 8/1991 | Bruckert | 455/54.1 |
| 5,109,527 | 4/1992 | Akerberg | 455/33.2 |
| 5,134,709 | 7/1992 | Bi et al. | 455/33.1 |

Primary Examiner—Reinhard J. Eisenzopf
Assistant Examiner—Lisa Charouel
Attorney, Agent, or Firm—Jean-Pierre Fortin

[57] ABSTRACT

The intra-cell call hand-over technique of this invention is characterized by the use of channel information from both base station and subscriber terminal in determining a standby radio traffic channel upon which to hand over a call. Communication between the base station and subscriber terminal is carried out on an inband or associated signalling channel for the selection of the standby traffic channel. The standby radio channel is the channel, which, of a set of channels under consideration by the subscriber terminal, contains the least amount of interference as measured at the subscriber terminal. The set of channels under consideration by the subscriber terminal is a subset of the entire set of channels allocated to the service. This subset is comprised of those channels having little interference as measured by the base station. The call hand-over technique thereby assures that calls proceed on channels containing little interference from the viewpoints of both base station and subscriber terminal.

8 Claims, 6 Drawing Sheets

INTRA-CELL CALL HAND-OVER IN RADIO COMMUNICATION SYSTEMS WITH DYNAMIC CHANNEL ALLOCATION

FIELD OF THE INVENTION

This invention relates to radio communication systems which use dynamic channel allocation, especially, but not restricted to, cellular radio systems.

DESCRIPTION OF THE PRIOR ART

A duplex radio link conveying user analogue and/or digital information shall henceforth be referred to as a "call". An example is a telephone call over a wireless channel.

Cellular radio communication systems are able to service a high volume of traffic with a limited amount of radio spectrum by re-using the same radio channels in sufficiently separated cells. In conventional city-wide mobile cellular systems, such as the North American Advanced Mobile Phone System, the frequency allocations for a specific cell are fixed; i.e., each cell can make use of only a specified subset of channels of those allocated to the entire service. The allocations of channels require careful engineering analyses of radio propagation conditions and traffic patterns within and between the cells. Fixed allocation cellular radio systems are engineered so that harmful levels of interference from signals used in neighboring cells are unlikely to be encountered.

When a subscriber terminal moves out of the coverage area of one base station and into that of another, the call may be maintained by switching the communication link to the closer base station. This is known as an "inter-cell" hand-over, i.e., between cells. A description of an inter-cell call hand-over is disclosed in a co-pending application entitled "Improved Inter-cell Call Hand-over in Radio Communication Systems With Dynamic Channel Allocation", filed on Jun. 6, 1991 and having Ser. No. 07/710,867. On the other hand, when the communication link changes channels without changing the base station that communicates with the subscriber, it is known as an "intra-cell" hand-over, i.e., within a cell. Intra-cell call hand-overs are usually necessitated by the presence of interference on the channel.

Micro-cellular radio systems tend to use dynamic, rather than fixed, channel allocation. With dynamic channel allocation (DCA) each cell can potentially use any traffic channel for a given call of those allocated to the entire service. The decision as to which channel to use is made dynamically, i.e., based on channel usage conditions experienced at the time of call set-up. The decision is also made in a decentralized manner, i.e., by the base station or subscriber terminal in question, without any centralized coordination with other cells. This has the advantages that no detailed engineering analyses are required for each cell site, cell sites can be easily added or moved, and more traffic can be handled than with fixed allocation because channels unused in neighboring cells can be "borrowed".

Examples of radio systems which use DCA are the digital U.K. CT2 system, and some models of analogue North American 46/49 MHz cordless telephones. In present systems incorporating DCA, the determination of which channel is used for a call set-up or hand-over is made according to channel information from either the base station or the subscriber terminal. The disadvantage with this approach is that appreciable interference may be present on that channel from the viewpoint of the other end of the link. For example, a traffic channel may have little appreciable interference, as monitored by the base station. However, the same traffic channel may have unacceptable interference at the subscriber terminal. Therefore, the presence of interference may reduce the quality of the link and also make it more susceptible to any further channel impairments which might arise.

There is accordingly a need for an intra-cell hand-over which allows for the selection of other traffic channels suitable for transmission at the both ends of the transmission link when the signal quality on the current traffic channel deteriorates beyond an acceptable level.

SUMMARY OF THE INVENTION

An object of the present invention is to provide an improved method for performing an intra-cell hand-over in radio systems with DCA, in which another traffic channel is selected according to channel information from both base station and subscriber terminal, to be used when the interference level on the current traffic channel deteriorates beyond an acceptable level.

After the call set-up is established, a number of channels are also selected as reserved or standby secondary channels in the event that an intra-cell hand-over is required. Prior to an intra-cell hand-over, the base station continuously or periodically scans a list of available traffic channels which have low interference from its perspective to make sure that a standby traffic channel is available for an intra-cell hand-over. The list is forwarded to the subscriber terminal over an inband or associated signalling channel. The subscriber terminal checks these candidates, chooses one or more traffic channels which have low interference from its perspective, from among the candidates and reports these choices to the base station over an inband or associated signalling channel. In the preferred embodiment, the channel having the lowest interference level is reported. In the event of an intra-cell hand-over, the call would proceed on an agreed upon standby traffic channel. This process of query by the base station and response by the subscriber terminal occurs routinely throughout the course of the call, generally, whenever the status of the standby traffic channels changes.

Therefore, it is an aspect of the present invention to provide a method for completing an intra-cell call hand-over from a current traffic channel used between a base station and a subscriber terminal to a standby traffic channel, comprising the steps of:

selecting, from a plurality of traffic channels available for service, standby traffic channels determined to be useable at the base station;

sending a message, to the subscriber terminal, along an inband signalling channel linking the base station and the subscriber terminal, the message being indicative of a list of standby traffic channels determined to be useable at the base station;

receiving the message at the subscriber terminal;

selecting, from the list of standby traffic channels indicated in the message, standby traffic channels determined to be useable at the subscriber terminal;

forwarding a response message, to the base station, along the inband signalling channel, the response message being indicative of which standby traffic channels were determined to be useable at the subscriber terminal;

monitoring the signal quality on the current traffic channel;

sending a request for a new traffic channel if the signal quality on the current traffic channel deteriorates to an unacceptable level; and switching the base station and the subscriber terminal to a selected standby traffic channel.

DESCRIPTION OF THE PREFERRED EMBODIMENT

Figure 1:
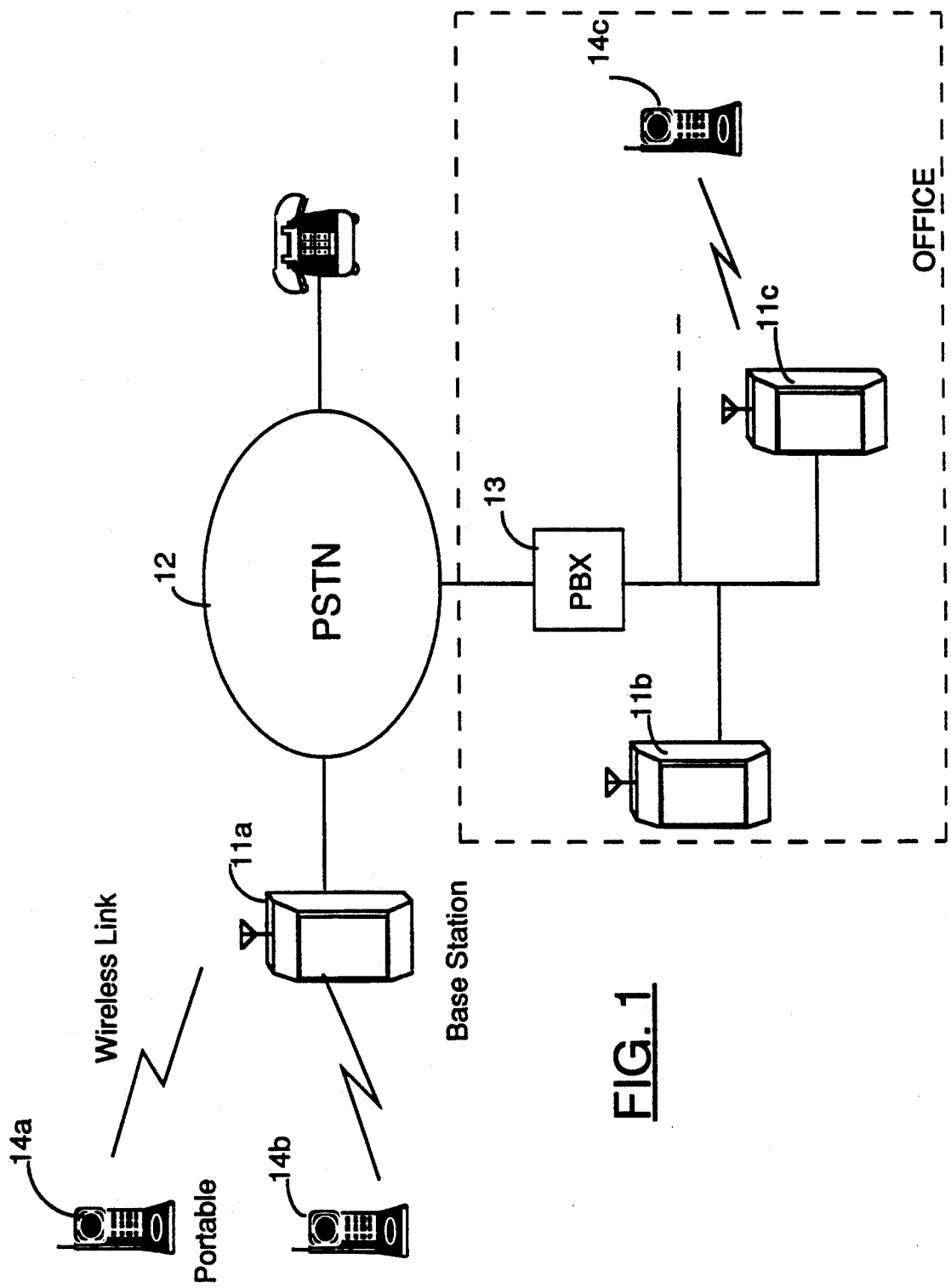
FIGS. 1 and 2 are illustrations of a radio systems embodying the invention.

In the illustration of FIG. 1, a low-power wireless communication system is shown. A typical network can consist of small base station 11a connected to the Public Switched Telephone Network (PSTN) 12 and base stations 11b and 11c connected to the PSTN 12 via an office PBX 13. The base stations are basically used as radio transceivers. These can be deployed in offices, residences, and public areas, such as airports, gas stations and shopping malls, etc. The base stations 11a, 11b and 11c, form the interface between a number of subscriber terminals such as portable handsets 14a, 14b and 14c and PSTN 12. Several base stations can also be linked to a host, such as a private branch exchange PBX 13 to provide coverage of larger areas in, say, a private business or office building. Such a wireless PBX system is disclosed in U.S. Pat. No. 4,771,448.

It has been demonstrated that a radio link between a base station and a subscriber terminal may be established which, although it may be free of interference upon call set-up, may be affected by interference sometime thereafter, for example, another call is set-up in a neighboring cell on the same channel, therefore reducing the overall quality of the link.

Figure 2:
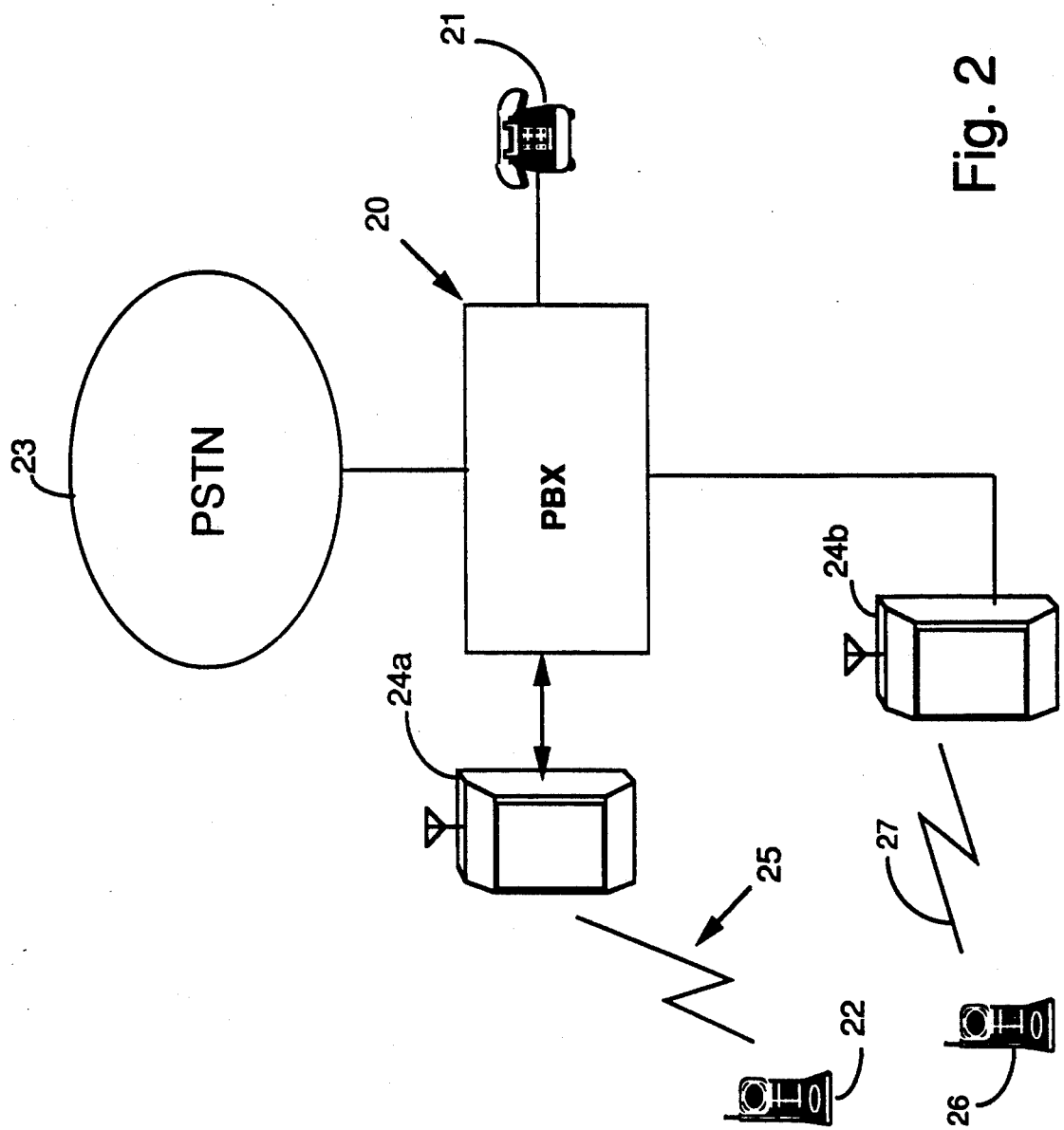

Referring now to FIG. 2, we have shown a low power wireless communication system which be installed in a private business or office building. A PBX 20 is used by a wired telephone set 21 and a wireless subscriber terminal 22 to establish call connections to PSTN 23. Base stations 24a and 24b can be placed at various locations in the office building to allow the use of a wireless subscriber terminal 22 where required. In the illustration, subscriber terminal 22 is being served by base station 24a on a selected traffic channel 25. Each base station continuously scan or periodically scans a list of traffic channels for the selection of standby traffic channels which may be used when an intra-cell call hand-over becomes necessary. With the embodiment of the present invention, the base stations 24a and 24b would scan all available traffic channels, and select standby traffic channels that are useable or free of interference at the base station's end of the link. A list of standby traffic channels is made and forwarded to subscriber terminals via an inband or associated signalling channel linking the base station and the subscriber terminals. Once received, the list of standby traffic channels, is scanned by subscriber terminals. The subscriber terminals can then select standby traffic channels which are also free of interference at the subscriber end of the link. The preferred standby channel is selected and acknowledged to the base stations, again via the inband or associated signalling channel. This process of query by the base stations and response by the subscriber terminals may occur routinely throughout the time the call is in progress and more particularly, whenever the status of the preferred standby traffic channel changes.

In the event that interference arises on the communication channel linking the base station and the subscriber terminal, an intra-cell hand-over may be necessary. That is, another channel without interference would be selected. For example, in FIG. 2, a new subscriber terminal 26 is requesting access to a traffic channel with base station 24b. If the selected traffic channel 27 between the base station 24b and the subscriber terminal 26 is on the same frequency as the traffic channel 25, interference can exist if subscriber terminal 26 is too close to base station 24a, or if subscriber terminal 22 is too close to base station 24b. Thus, an intra-cell hand-over would be necessary. In the event that the signal quality deteriorates on traffic channel 25, a request to switch to a new channel would be initiated by either the subscriber terminal 22 or its base station 24a. When an intra-cell call hand-over occurs, both the subscriber terminal 22 and base station 24a switch over to the standby traffic channel.

In the preferred embodiment, the base stations 24a and 24b would be designed to prescan all traffic channels and select 3 standby traffic channels which have the lowest level of interference. The list of 3 standby channels would be made available to the subscriber terminals and the preferred standby channel would be selected. Thus, if a request for a new channel is received, a hand-over can quickly be initiated to the selected standby channel without the delay needed to find another traffic channel.

The signalling and traffic channels of the wireless communication system may be used in time-division duplex mode. That is, base station and subscriber terminal share the same carrier frequency but alternately transmit so that their transmissions do not overlap. This technique is commonly referred to as "ping-pong". This is shown in FIG. 3.

Figure 3:
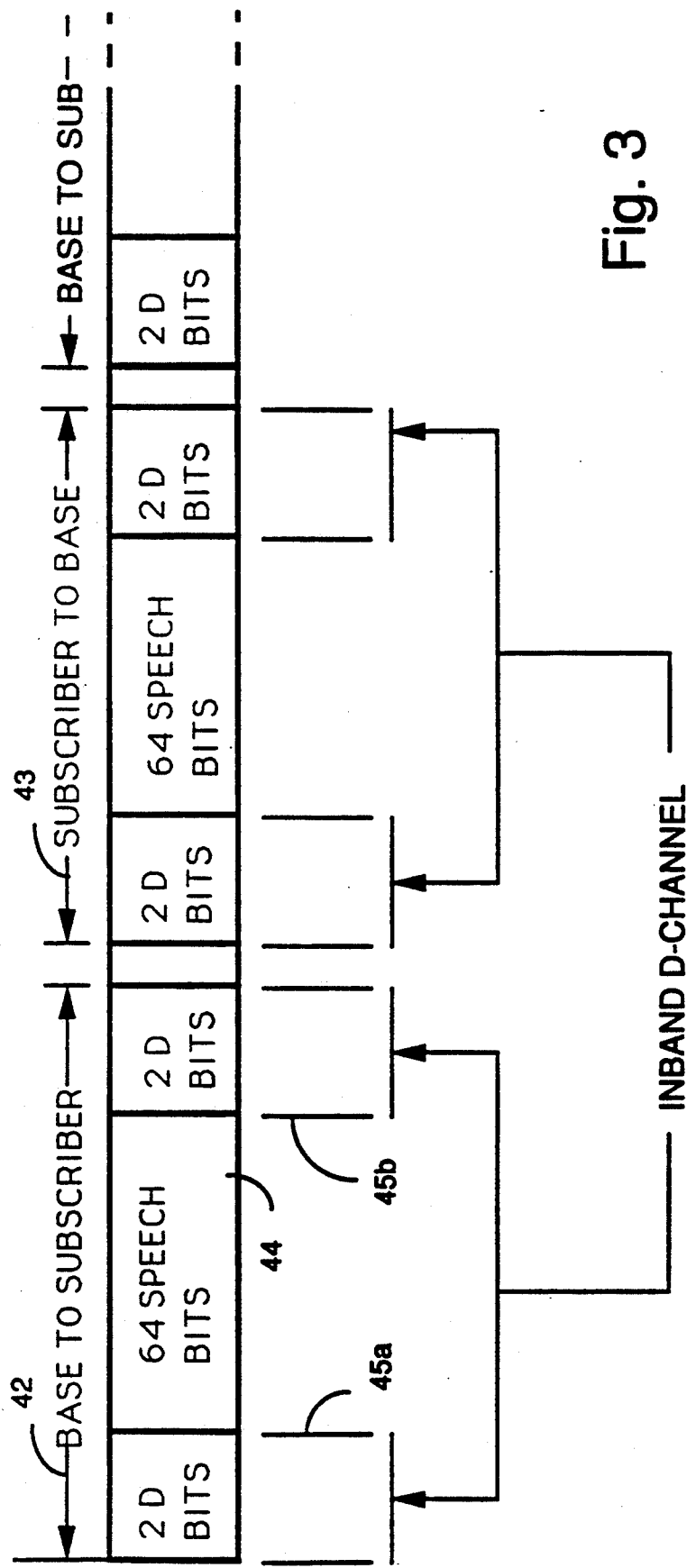
FIG. 3 is an illustration of the frame structure of a traffic channel.

As shown in FIG. 3, the frame structure comprises one time slot 42 for outbound communication from the base stations to the subscriber terminals and another time slot 43 of the frame is used for inbound communication from the subscriber terminals to the base stations. Each slot in a frame consist of a voice or data portion 44 and an inband or associated signalling D-channel comprised of two sets of bits 45a and 45b. In the preferred embodiment, the voice or data portion contains 64 bits of information per frame and the inband or associated signalling channel contain 4 bits of information per frame. In FIG. 3, the two sets of signalling bits 45a and 45b are separated by the voice or data portion 44, such that 2 bits of signalling information is first sent, followed by 64 bits of voice or data and then another 2 bits of signalling information. It will be known to those knowledgeable in this art, that the inband or associated signalling D-channel is a duplex channel, i.e. wherein one frame 42 is used for one-way communication from the base station to the subscriber terminal and one frame 43 used for one-way communication from the subscriber terminal to the base station.

Figure 4A:
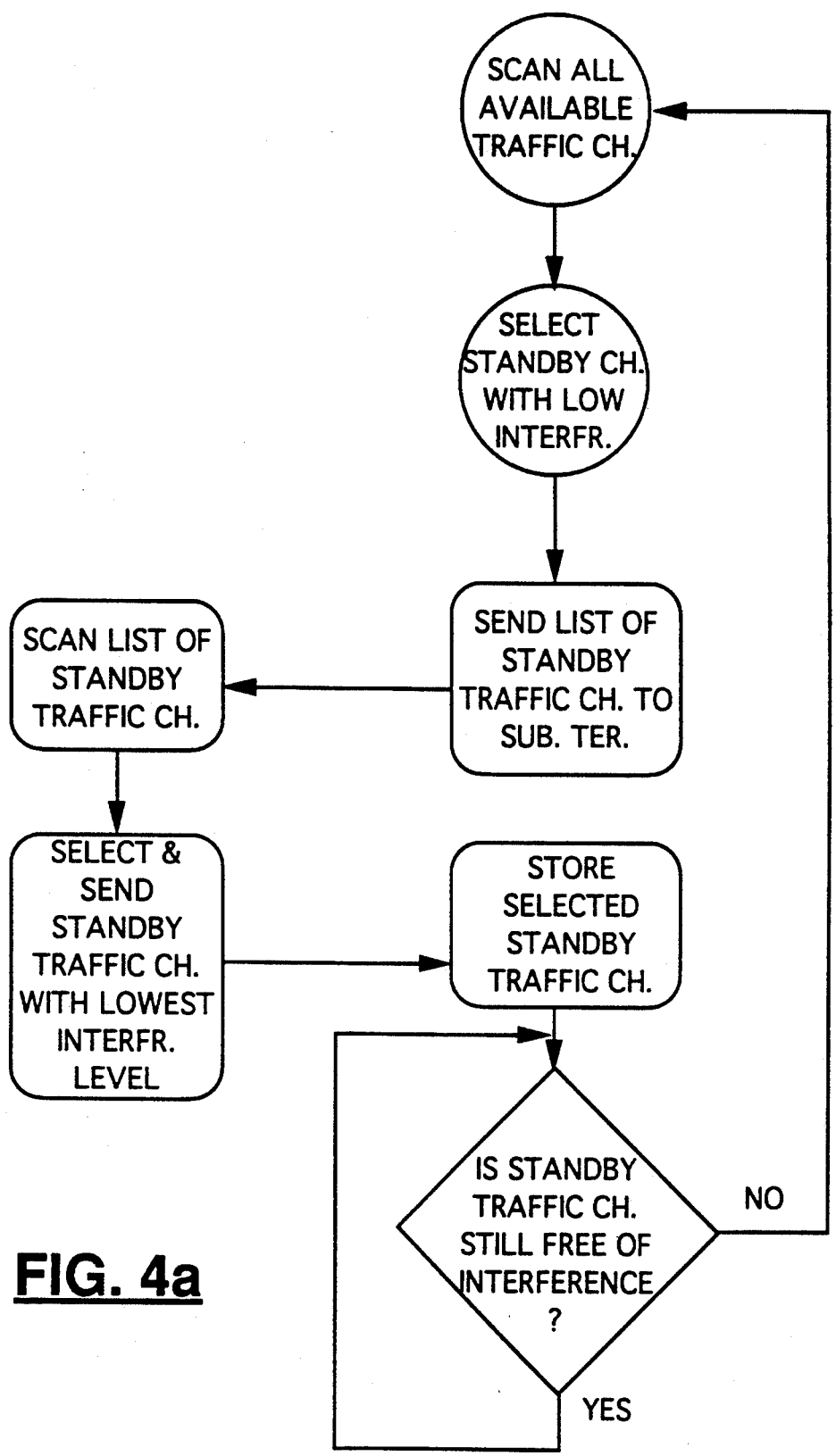
FIGS. 4a, 4b and 4c are flow diagrams illustrating the intra-cell call hand-over procedures of the present invention.
Figure 4B:
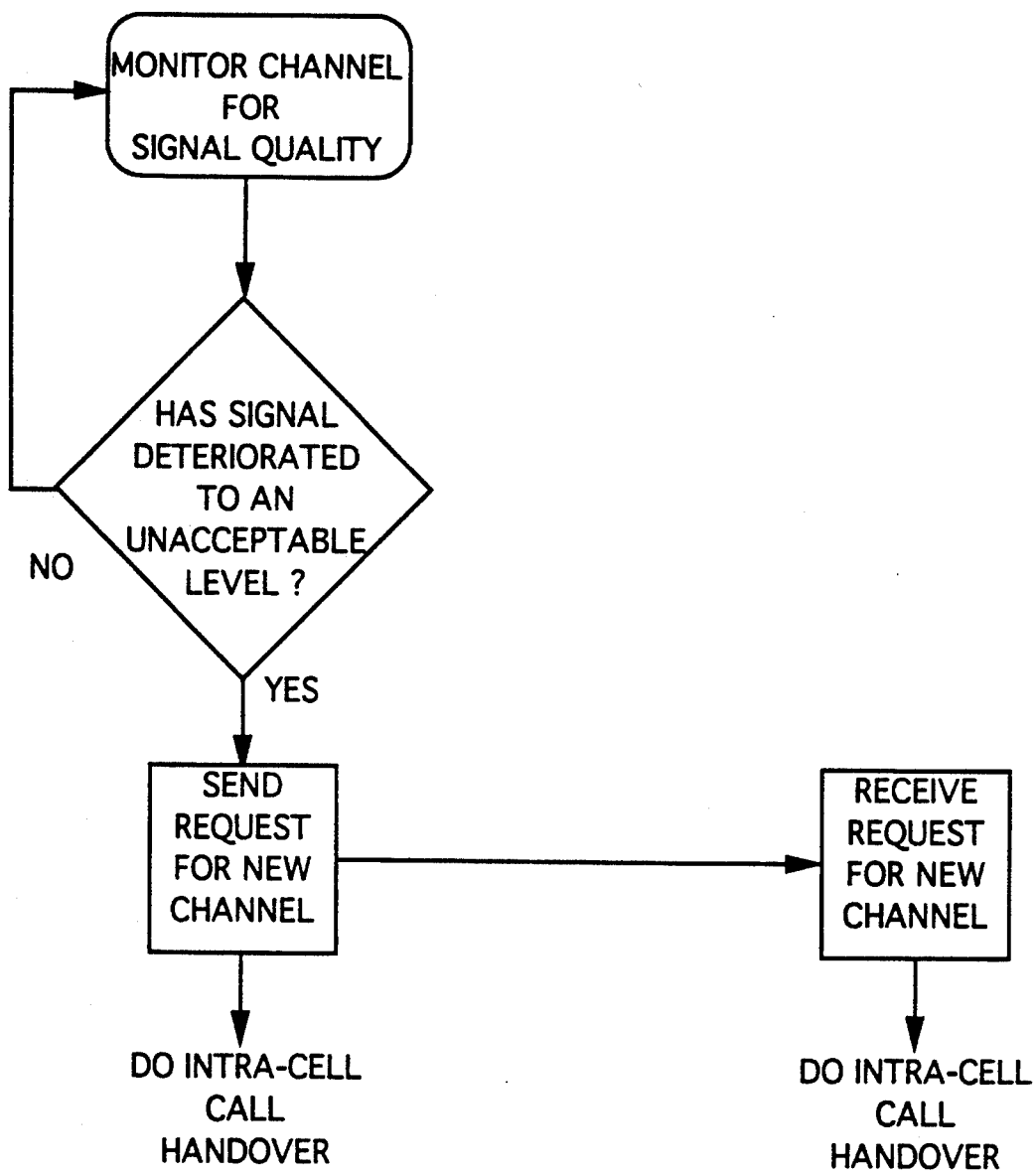
Figure 4C:
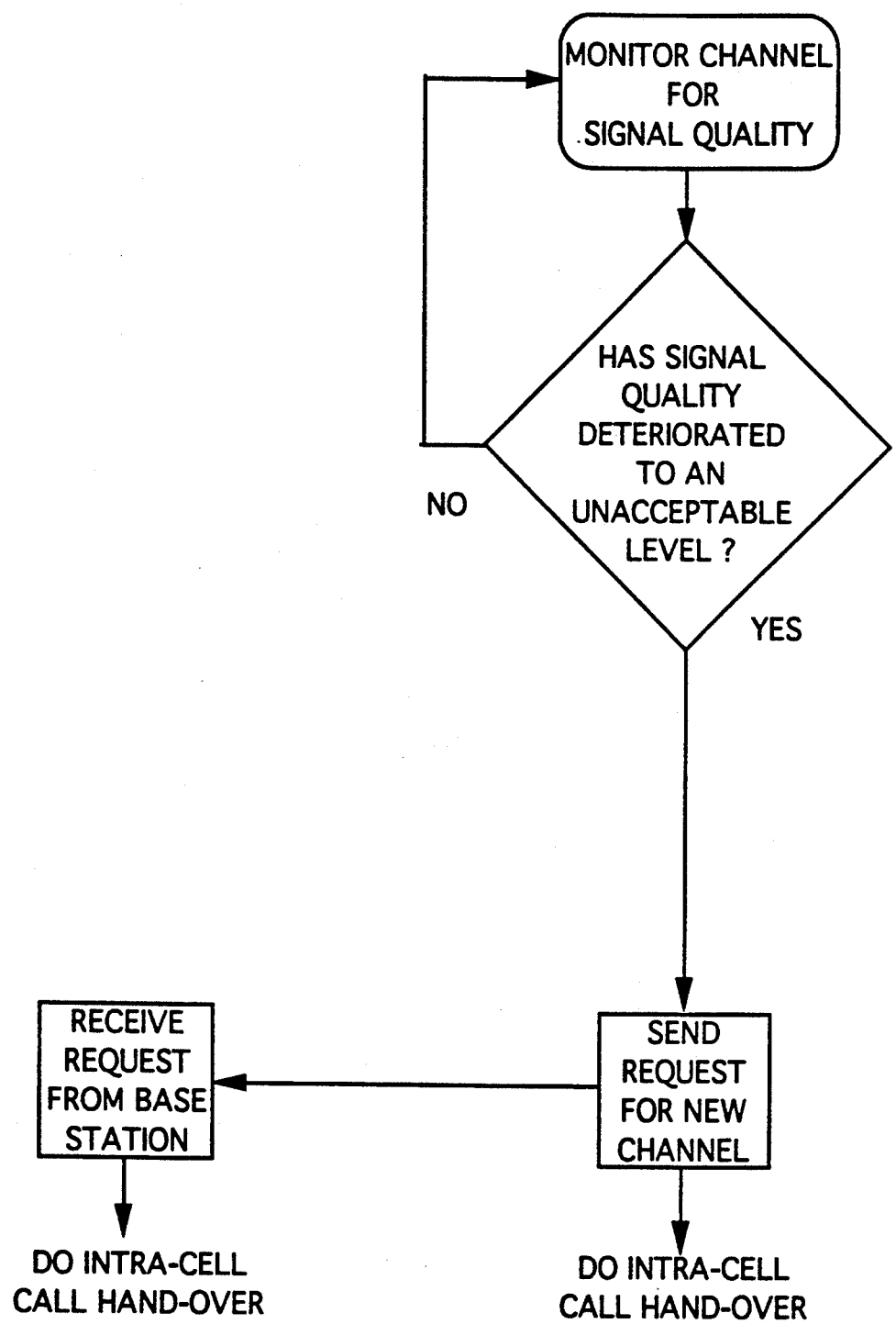

FIGS. 4a, 4b and 4c illustrate the flow of information between the base station and a subscriber terminal prior to and during an intra-cell call hand-over. In FIG. 4a, the process of standby traffic channel selection is illustrated. In FIG. 4b, the subscriber terminal sends a request for an intra-cell call hand-over. In FIG. 4c, the base station sends the request for an intra-cell call hand-over.

The measurement of the interference power present in each of standby traffic channels would be carried out by a receiver at the base station on a frequent basis. The receiver which carries out the scan could be, but need not be, the same receiver which communicates with the subscriber terminal.

What is claimed is:

1. A method of completing an intra-cell call hand-over from a current traffic channel used between a base station and a subscriber terminal to a standby traffic channel, comprising the steps of:
    selecting, from a plurality of traffic channels available for service, a first group of standby traffic channels determined to be useable at the base station;
    sending a message, to the subscriber terminal, along an inband signalling channel linking the base station and the subscriber terminal, the message being indicative of the standby traffic channels in said first group which are determined to be useable at the base station;
    receiving the message at the subscriber terminal;
    selecting, from said first group of standby traffic channels indicated in the message, a second group of standby traffic channels determined to be useable at the subscriber terminal;
    forwarding a response message, to the base station, along the inband signalling channel, the response message being indicative of the standby traffic channels of said second group which were determined to be useable at the subscriber terminal;
    monitoring the interference level on a current traffic channel;
    sending a request for a new traffic channel if the interference level on the current traffic channel changes to an unacceptable level; and
    switching the base station and the subscriber terminal to one of the standby traffic channels selected from said second group of traffic channels.

2. A method as defined in claim 1, wherein said first group of standby traffic channels are selected from the plurality of traffic channels available for service by:
    scanning, at the base station, each of the traffic channels in said plurality of traffic channels;
    measuring the interference level of each of the traffic channels and
    identifying the traffic channel as a useable standby traffic channel if the interference level is below a first predetermined threshold.

3. A method as defined in claim 2, wherein additional useable standby traffic channels are selected from the plurality of traffic channels available for service if an inadequate number of the standby traffic channels were found to have interference levels below the first predetermined threshold.

4. A method as defined in claim 3, wherein if the additional useable standby traffic channels are selected, the additional useable standby traffic channels having the lowest interference level above the first predetermined threshold will be selected.

5. A method as defined in claim 4, wherein if any remaining standby traffic channels have an excessive level of interference considered to offer inadequate communication between the base station and the subscriber terminal, they will be excluded from the selection.

6. A method as defined in claim 2, wherein said message is sent to the subscriber terminal by:
    storing said first group of standby traffic channels; and
    forwarding to the subscriber terminal a list of said first group of standby traffic channels.

7. A method as defined in claim 6, wherein standby traffic channels on the list are determined to be useable at the subscriber terminal by:
    scanning each of the standby traffic channels of said first group identified on the list;
    measuring the interference level of each of the standby traffic channels;
    selecting the standby traffic channel with the lowest level of interference; and
    storing the selected standby traffic channel.

8. A method as defined in claim 6, wherein the standby traffic channels on the list are determined to be useable at the subscriber terminal by:
    scanning each of the standby traffic channels of said first group identified on the list;
    measuring the interference level on each of the standby traffic channels;
    selecting, while the standby traffic channels are being scanned, a first standby traffic channel found to have an interference level below a second threshold; and
    storing the selected standby traffic channel.

* * * * *